United States Patent
Harrold

(10) Patent No.: US 7,231,235 B2
(45) Date of Patent: Jun. 12, 2007

(54) WIRELESS COMMUNICATION TERMINALS

(75) Inventor: William Basil Harrold, Royston (GB)

(73) Assignee: TTPCom Limited, Hertfordshire (GB)

( * ) Notice: Subject to any disclaimer, the term of this patent is extended or adjusted under 35 U.S.C. 154(b) by 97 days.

(21) Appl. No.: 10/510,062

(22) PCT Filed: Apr. 3, 2003

(86) PCT No.: PCT/GB03/01462

§ 371 (c)(1),
(2), (4) Date: May 2, 2005

(87) PCT Pub. No.: WO03/084084

PCT Pub. Date: Oct. 9, 2003

(65) Prior Publication Data

US 2005/0221862 A1    Oct. 6, 2005

(30) Foreign Application Priority Data

Apr. 3, 2002    (GB) ................... 0207732.9

(51) Int. Cl.
*H04B 1/38* (2006.01)

(52) U.S. Cl. ............... 455/574; 455/127.5; 455/343.1
(58) Field of Classification Search ............... 455/563, 455/404.1, 404.2, 567, 564, 569.1, 570, 572, 455/574, 343.1, 343.2, 343.4; 704/214–223, 704/208, 231
See application file for complete search history.

(56) References Cited

U.S. PATENT DOCUMENTS

| | | | | | |
|---|---|---|---|---|---|
| 4,903,319 | A | * | 2/1990 | Kasai et al. | 455/574 |
| 4,933,963 | A | * | 6/1990 | Sato et al. | 704/224 |
| 5,222,121 | A | * | 6/1993 | Shimada | 379/88.03 |
| 5,842,139 | A | * | 11/1998 | Muramatsu et al. | 455/563 |
| 6,088,576 | A | * | 7/2000 | Sone | 370/7.33 |
| 6,108,543 | A | * | 8/2000 | Takahashi et al. | 455/434 |

FOREIGN PATENT DOCUMENTS

| | | |
|---|---|---|
| DE | 296 21 022 U | 2/1997 |
| EP | 0 498 398 B1 | 8/1992 |
| EP | 1 119 159 A | 7/2001 |
| JP | 08-298698 * | 11/1996 |
| WO | WO 01/61872 A2 | 8/2001 |

OTHER PUBLICATIONS

International Search Report for PCT/GB03/01462; Filed Apr. 3, 2003; Date of Completion Jul. 31, 2003; Date of Mailing Aug. 6, 2003.

* cited by examiner

*Primary Examiner*—Charles N. Appiah
(74) *Attorney, Agent, or Firm*—Alston & Bird LLP

(57) ABSTRACT

The audio input system (6) of a terminal, such as a mobile telephone, is powered up during the standby mode, either with the paging channel or any other short duration channel such as a monitoring channel, and is then used to recognize narrow bandwidth sounds such as a whistle, to activate the telephone. Once activated, the telephone may then be responsive to voice commands and may then support a speaker phone mode of application.

13 Claims, 1 Drawing Sheet

WIRELESS COMMUNICATION TERMINALS

This invention relates to wireless communication terminals, especially mobile telephones, and the hands-free activation of such terminals.

It is known to incorporate voice recognition software in mobile telephones to allow users to dial a caller by name. However, in order to make use of this facility, the telephone has to be operated manually because, even when in the standby mode, the audio system is not normally turned on. Instead, the receiver only is powered up to receive the paging channel to check for incoming call requests, and for reasons of power saving, the audio system remains turned off.

According to the invention, a wireless communication terminal is adapted so that it is capable of recognizing a predetermined sound in the vicinity of the terminal and its audio input system is powered on periodically when the terminal is in the standby mode and serves to activate the terminal if said predetermined sound is recognized.

Preferably, the audio input system is powered up with the paging channel, and preferably only operates during the paging channel for reasons of power saving, and then processes the received audio signal to recognize said predetermined sound if it is present. In a DSP based GSM terminal, the same DSP processor is used for the radio modem and audio processing, and therefore powering up the processor for paging will automatically make the audio processing function available and produce said audio signal if the audio input system is also powered up.

The paging channel in a mobile telephone consists of a number of paging blocks of short duration separated by an interval of 0.5 to 2.5 seconds. For example, a GSM terminal has a paging channel of four data blocks or bursts, each 4.615 ms long. Each burst has a portion allocated to radio modem processing and the remainder allocated to audio processing, which over four bursts might total 16 ms. Thus, the audio input system of a GSM terminal according to the invention has to recognize said predetermined sound over a short interval of about 16 ms, which would be difficult for a speech pattern. Preferably, therefore, the sound selected is a whistle, which has a narrow bandwidth characteristic and changes only slowly with time so that it can be more easily recognized from a short sample. Also, a whistle can be more easily distinguished from other sounds and will therefore avoid false responses.

The invention is therefore based on the fact that sound recognition is a useful function that can be switched on periodically in a mobile telephone during the standby mode, either with the paging channel or any other short duration channel such as a monitoring channel, and can then be used to recognize narrow bandwidth sounds such as a whistle, to activate the telephone. Once activated, the telephone may then be responsive to voice commands and may then support a speaker phone mode of application.

The invention will now be described by way of example with reference to the accompanying drawings in which.

Figure 1:
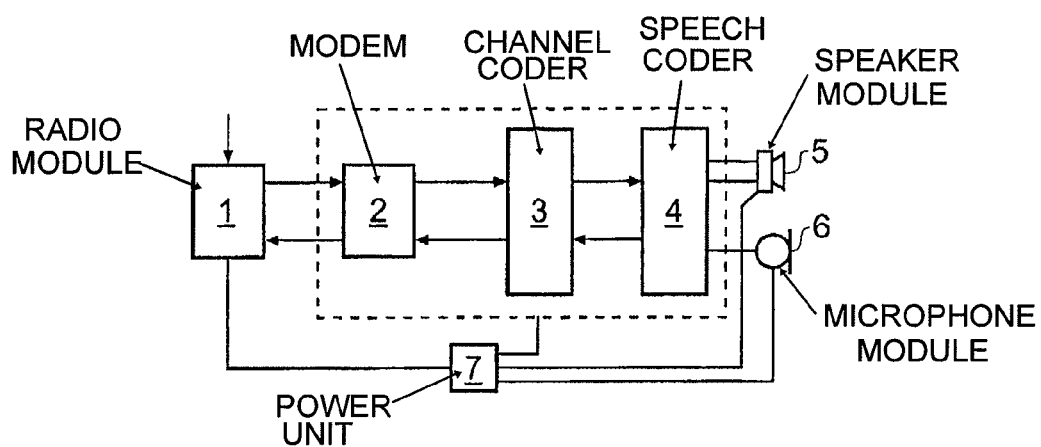
FIG. 1 is a schematic diagram of the major functions of a GSM mobile telephone terminal.

A typical GSM mobile terminal, as illustrated in FIG. 1, comprises a radio module 1 for receiving and transmitting radio signals in respective receiving and transmitting paths RX, TX, a modem 2 to process the signals in the receive and transmit paths, a channel coder 3 to process signals in transmit and receive channels and a speech coder 4 to process speech signals which are either output to a speaker module 5 or received from a microphone module 6. It will be appreciated that the modem 2, channel coder 3 and speech coder 4 are normally incorporated in one digital signal processor DSP, and a rechargeable battery power unit 7 supplies power to all of the above components.

When such a GSM mobile terminal is in the standby mode, the power unit 7 only powers up the radio module 1 and DSP on a low duty cycle to receive a paging radio channel to check whether an incoming call is being requested. The speaker module 5 and microphone module 6 are not powered up in the standby mode in order to save power until such time as they may be required.

Figure 2:
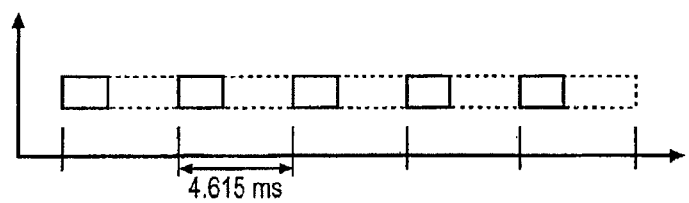
FIG. 2 is a schematic diagram of successive data frames or bursts in a GSM mobile telephone system.

The paging channel in GSM consists of four data frames or bursts, each 4.615 ms long, as shown in FIG. 2. The DSP is therefore powered up for about 18.5 ms, and this is repeated at an interval of 2.1 seconds. During each burst, the DSP is only processing data relating to the radio modem function, and this only occupies a minor part of the burst, the remaining major part of the burst being reserved for audio processing when the terminal is in call. The total reserved time for audio processing between four bursts totals about 16 ms, and it is a feature of the invention, that this reserved audio processing time is used by powering up the microphone module 6 during this time so that the audio input it generates is processed and compared with a predetermined audio input which is indicative of a "wake up" command from the user.

Figure 3:
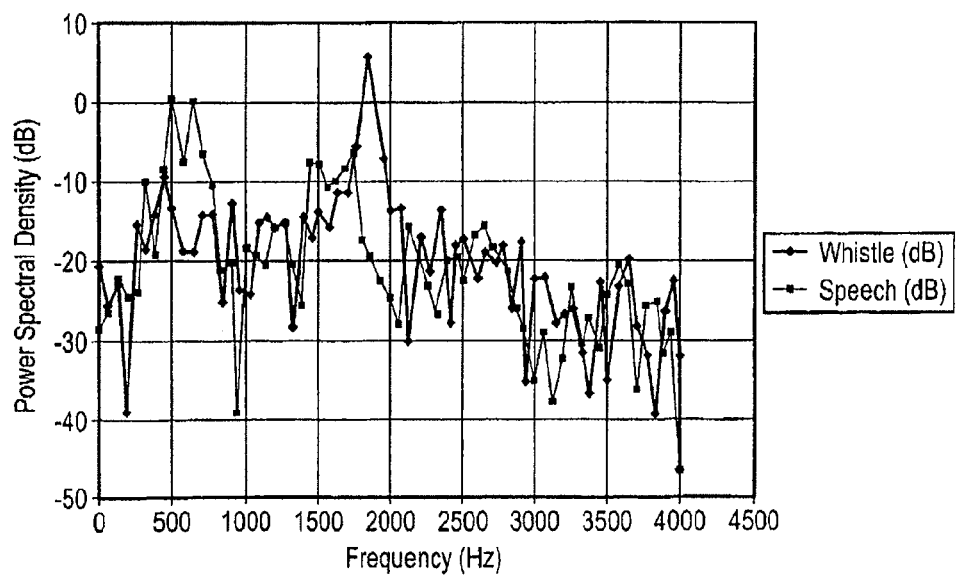
FIG. 3 is a graph showing the power spectrum of normal speech and a whistle.

Said predetermined audio input is preferably a whistle, this having a narrow bandwidth characteristic which makes it more easily recognizable from a short sample, as illustrated in FIG. 3. The graph shows typical power spectra for both a whistle and normal speech, and illustrates the fact that a whistle is essentially a fairly pure single audio tone, whereas speech contains significant power in more bands across the range. Thus, whistles can be detected from only a short time period because they are easily distinguished from other sounds such as background acoustic noise, which has no sharp peaks, speech which has multiple "formant" frequencies, and music, which like speech has multiple frequencies present.

It is not necessary that the whistle is of a particular pitch or even that the pitch is held constant with time. The recognition algorithm would merely take a snapshot of the signal and look for a single narrow-band peak much higher than the surrounding signal at other frequencies.

The key feature of the whistle is that it is narrow-band at all times; it is therefore not necessary to scan for it continuously in order to detect it. The GSM paging cycle allowing 16 ms samples of speech at a maximum of 2.1 s intervals is therefore sufficient for whistle recognition.

In a simple implementation, it would be necessary for the user to keep whistling for this maximum interval of 2.1 s to ensure that at least one block of audio samples is captured. However, if it turns out that this is too long to maintain a whistle, then the whistle length could be reduced with an increase in power consumption.

A suitable whistle recognition algorithm needs to detect a narrow-band signal of unknown frequency in the presence of speech with low false alarm probability. A pre-shaping filter would be provided to remove low frequency components from the signal which would otherwise affect the recognition process.

Reasonable recognition/false alarm results have been obtained using the following algorithm:—
(i) If the energy of the block of audio samples is above a threshold then take the FFT for 128 samples sampled at 8 kHz;
(ii) find the largest energy bin and find the width of the peak to half the peak power;
(iii) find the next largest peak excluding the interval found in (ii);
(iv) if the ratio of the energy in the first peak of the second peak is >10 dB then declare that the whistle has been recognized.

An alternative non-linear approach is based on the low variance of the phase increment per sample in the audio block for a whistle compared with speech.

Although the algorithm has been discussed in terms of GSM, it will be appreciated that it can be generalized for any wireless communications system. The only requirement is the capability to periodically switch on the audio hardware to sample 16 ms of audio data. All mobile phone systems should fulfill this requirement since the mobile will need to switch itself on periodically either to listen for paging signals (or their equivalent) or for network measurements, and being a phone it should have the appropriate audio capabilities. As long as this duty cycle is sufficient, the algorithm need not be modified.

In one embodiment of the invention, a mobile terminal is further adapted to include voice dialling and speaker phone operation. The user is then able to use the terminal in hands-free mode as follows:
(i) user whistles;
(ii) terminal responds with an acknowledgement, probably audible, e.g. a beep or some pre-recorded message or tune;
(iii) user says the voice command, e.g. a name to be dialled;
(iv) user engages in the call (using speaker phone operation)—or executes whatever other command has been pre-programmed.

Speaker phone operation with a mobile terminal requires a loud audio output and some form of echo control.

The invention claimed is:

1. A radio communication terminal comprising a radio module for processing radio signals, a processor for processing digital signals associated with the radio signals, an audio generator adapted to generate an audio input signal to the processor in response to sound in the vicinity of the terminal, a power supply, and a power controller to control connection of the power supply to the radio module and having a standby mode in which the radio module and processor are energized periodically to detect a radio channel, characterised in that in the standby mode the power controller energizes the audio generator to generate an audio input to the processor only during the radio channel, and the processor is adapted to respond to a predetermined sound by activating said terminal for communication.

2. A terminal as claimed in claim 1 in which the processor processes digital signals from the radio module during one or more successive data bursts of the radio channel.

3. A terminal as claimed in claim 2 in which the radio channel is a paging channel.

4. A terminal as claimed in claim 1 in which said predetermined sound comprises a narrow-band sound.

5. A terminal as claimed in claim 4 in which said predetermined sound comprises a whistle.

6. A terminal as claimed in claim 1 in which the processor incorporates a sound recognition algorithm which distinguishes said predetermined sound from speech in the audio input signal.

7. A terminal as claimed in claim 6 in which the recognition algorithm is adapted to detect total energy in the audio input signal above a predetermined threshold.

8. A terminal as claimed in claim 7 in which the recognition algorithm is adapted to detect multiple energy peaks at different frequencies in the audio input signal, and to compare the energy in these peaks.

9. A terminal as claimed in any one of the preceding claims which includes a pre-shaping filter to filter out low frequency components from the audio input signal before it is processed by the processor.

10. A terminal as claimed in any one of claims 1 to 6 in which the recognition algorithm is adapted to detect low variance of the phase increment per sample in an audio block for said predetermined sound compared with speech.

11. A terminal as claimed in claim 1 in which the terminal responds to said predetermined sound by generating an audible response.

12. A terminal as claimed in claim 1 which is adapted to recognize speech commands for setting up calls from the terminal.

13. A terminal as claimed in claim 1 which is adapted for speaker phone operation.

* * * * *